(12) United States Patent
Gondoh

(10) Patent No.: US 11,705,603 B2
(45) Date of Patent: Jul. 18, 2023

(54) BATTERY PACK EXHAUST DUCT AND BATTERY PACK

(71) Applicant: Panasonic Intellectual Property Management Co., Ltd., Osaka (JP)

(72) Inventor: Hiroaki Gondoh, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 65 days.

(21) Appl. No.: 16/977,161

(22) PCT Filed: Feb. 13, 2019

(86) PCT No.: PCT/JP2019/004943
§ 371 (c)(1),
(2) Date: Sep. 1, 2020

(87) PCT Pub. No.: WO2019/176415
PCT Pub. Date: Sep. 19, 2019

(65) Prior Publication Data
US 2021/0066690 A1     Mar. 4, 2021

(30) Foreign Application Priority Data

Mar. 12, 2018   (JP) .............................. JP2018-044674

(51) Int. Cl.
*H01M 50/35*     (2021.01)
*H01M 50/209*    (2021.01)

(52) U.S. Cl.
CPC ......... *H01M 50/35* (2021.01); *H01M 50/209* (2021.01); *H01M 2200/20* (2013.01); *H01M 2220/20* (2013.01)

(58) Field of Classification Search
CPC .. H01M 50/35; H01M 50/20; H01M 10/0525; H01M 50/249; H01M 50/209;
(Continued)

(56) References Cited

U.S. PATENT DOCUMENTS

2013/0065100 A1*   3/2013   Kim ................... H01M 50/172
                                                   429/82
2014/0093756 A1    4/2014   Nemoto et al.
(Continued)

FOREIGN PATENT DOCUMENTS

| CN | 103715385 A | 4/2014 |
| JP | 2015-135749 | 7/2015 |
| WO | 2016/136193 | 9/2016 |

OTHER PUBLICATIONS

International Search Report of PCT application No. PCT/JP2019/004943 dated May 14, 2019.
(Continued)

*Primary Examiner* — Kiran Quraishi Akhtar
(74) *Attorney, Agent, or Firm* — McDermott Will & Emery LLP

(57) ABSTRACT

A battery pack exhaust duct includes a guide tube, an exhaust inlet, an exhaust outlet, and exhaust guide components. The exhaust guide components include first and second exhaust guide components. Each of the exhaust guide components has a first part and a second part. The first part has a first end that is nearer to the interior surface of the guide tube. The first part extends away from the interior surface, and toward the exhaust inlet. The second part has a first end that is nearer to the first part. The second part extends toward the interior surface. The second part has a second end that is apart from the interior surface. The second end of the second part of the first exhaust guide component and the second end of the second part of the second exhaust guide component are displaced along axis X along which the guide tube extends.

12 Claims, 6 Drawing Sheets

(58) Field of Classification Search
CPC ............. H01M 50/367; H01M 50/383; H01M 50/202; H01M 2200/00; H01M 2200/20; H01M 2220/20; Y02E 60/10
See application file for complete search history.

(56) References Cited

U.S. PATENT DOCUMENTS

2014/0322566 A1\* 10/2014 Kim ................ H01M 50/20
 429/56
2017/0237055 A1\* 8/2017 Shimizu ............ H01M 50/35
 429/53

OTHER PUBLICATIONS

English Translation of Chinese Office Action dated Jul. 5, 2022 for the related Chinese Patent Application No. 201980015756.4.

\* cited by examiner

BATTERY PACK EXHAUST DUCT AND BATTERY PACK

CROSS-REFERENCE TO RELATED APPLICATIONS

This application is a U.S. national stage application of the PCT International Application No. PCT/JP2019/004943 filed on Feb. 13, 2019, which claims the benefit of foreign priority of Japanese patent application 2018-044674 filed on Mar. 12, 2018, the contents all of which are incorporated herein by reference.

TECHNICAL FIELD

The present invention relates to a battery pack exhaust duct and a battery pack.

BACKGROUND ART

A battery stack that includes a plurality of batteries connected in series is known as a power source that is required to output a high voltage. The power source that is required to output a high voltage is used for vehicles, for example. The battery stack generally includes a plurality of batteries that are stacked together and are bound together with binding bars. The battery stack is generally housed in a housing of a battery pack. Each of the batteries generally includes a valve. The valve opens if a pressure increases within the battery. A chemical reaction occurs within each of the batteries and generates gas. Consequently, if a pressure increases within each of the batteries, gas at a high temperature and at a high pressure is discharged through the valves. The gas at a high temperature and at a high pressure is discharged into the housing of the battery pack from within each of the batteries. Therefore, the housing of the battery pack contains an exhaust duct. The gas is discharged from the housing through the exhaust duct.

The exhaust from the batteries contains flammable gas. The exhaust also contains particles, such as debris of components of the batteries. If particles at a high temperature and flammable gas are discharged from the housing, and oxygen exists outside the housing, ignition may occur and smoke may be produced. Various measures against such ignition and production of smoke have been studied.

For example, PTL 1 discloses a plurality of flat sheets arranged within an exhaust channel. Through the exhaust channel, exhaust that has been discharged from batteries and is at a high temperature and a high pressure is discharged from a case. Due to the plurality of flat sheets, a flow of the exhaust meanders. Consequently, the exhaust flows through a longer distance. In PTL 1, the exhaust flows through the longer distance. Consequently, a temperature and a pressure of the exhaust are lowered. Consequently, ignition and production of smoke are not allowed. PTL 2 discloses a cyclonic particle-removing mechanism. The cyclonic particle-removing mechanism is cylindrical. The cyclonic particle-removing mechanism is connected with an airtight container that stores batteries. In PTL 2, the particle-removing mechanism collects particles that are in exhaust discharged from the batteries and are at a high temperature. Consequently, ignition and production of smoke are not allowed.

CITATION LIST

Patent Literature

PTL 1: WO 2016/136193 A1
PTL 2: Unexamined Japanese Patent Publication No. 2015-135749

SUMMARY OF THE INVENTION

A purpose of the configuration disclosed in PTL 1 is to lower a temperature and a pressure of exhaust. Since a temperature and a pressure of exhaust are lowered, the exhaust does not ignite and smoke is not produced. However, particles at a high temperature may ignite, and smoke may be produced. In this respect, particle collection efficiency of the configuration in PTL 1 is not sufficient. Further, the configuration cools particles slightly, but does not sufficiently cool the particles not to allow ignition and production of smoke.

The cyclonic particle-removing mechanism disclosed in PTL 2 collects particles that ignite. However, the cyclonic particle-removing mechanism is cylindrical. Therefore, a space around the cyclonic particle-removing mechanism cannot be used. That is to say, the cyclonic particle-removing mechanism does not efficiently occupy a space. Further, it is difficult to dispose the cyclonic particle-removing mechanism in a small space. Therefore, the particle-removing mechanism increases a size of a battery pack. Alternatively, the particle-removing mechanism does not allow a battery pack to be made smaller.

The present invention is made in view of the circumstances. It is one object of the present invention to provide techniques that increase particle collection efficiency of a battery pack exhaust duct, and allow the battery pack exhaust duct to efficiently occupy a space.

An aspect of the present invention is a battery pack exhaust duct. The battery pack exhaust duct is within a housing of a battery pack. The battery pack exhaust duct includes: a guide tube that is hollow; an exhaust inlet that connects an inside of the housing with an inside of the guide tube; an exhaust outlet that connects the inside of the guide tube with an outside of the housing; and at least two exhaust guide components arranged within the guide tube. The at least two exhaust guide components include a first exhaust guide component and a second exhaust guide component. The first exhaust guide component is disposed on a first interior surface of two interior surfaces of the guide tube that are opposite each other. The second exhaust guide component is disposed on a second interior surface of the two interior surfaces of the guide tube that are opposite each other. Each of the exhaust guide components has a first part and a second part. The first part has a first end that is nearer to the interior surface of the guide tube. The first part extends away from the interior surface, and toward the exhaust inlet. The second part has a first end that is nearer to the first part. The second part extends toward the interior surface near which the first part exists. The second part has a second end that is apart from the interior surface. The second end of the second part of the first exhaust guide component and the second end of the second part of the second exhaust guide component are at different positions along an axis along which the guide tube extends.

Another aspect of the present invention is a battery pack. The battery pack includes: a battery that includes a valve that opens to discharge gas if a pressure increases within the battery; the battery pack exhaust duct according to the above aspect; and a housing that houses the battery and the battery pack exhaust duct.

Any combination of the above components is also effective as an aspect of the present invention. Further, representations of the present invention may be converted into methods, devices, and systems. The methods, devices, and systems are also effective as aspects of the present invention.

The present invention increases particle collection efficiency of a battery pack exhaust duct, and allows the battery pack exhaust duct to efficiently occupy a space.

DESCRIPTION OF EMBODIMENT

Figure 1:
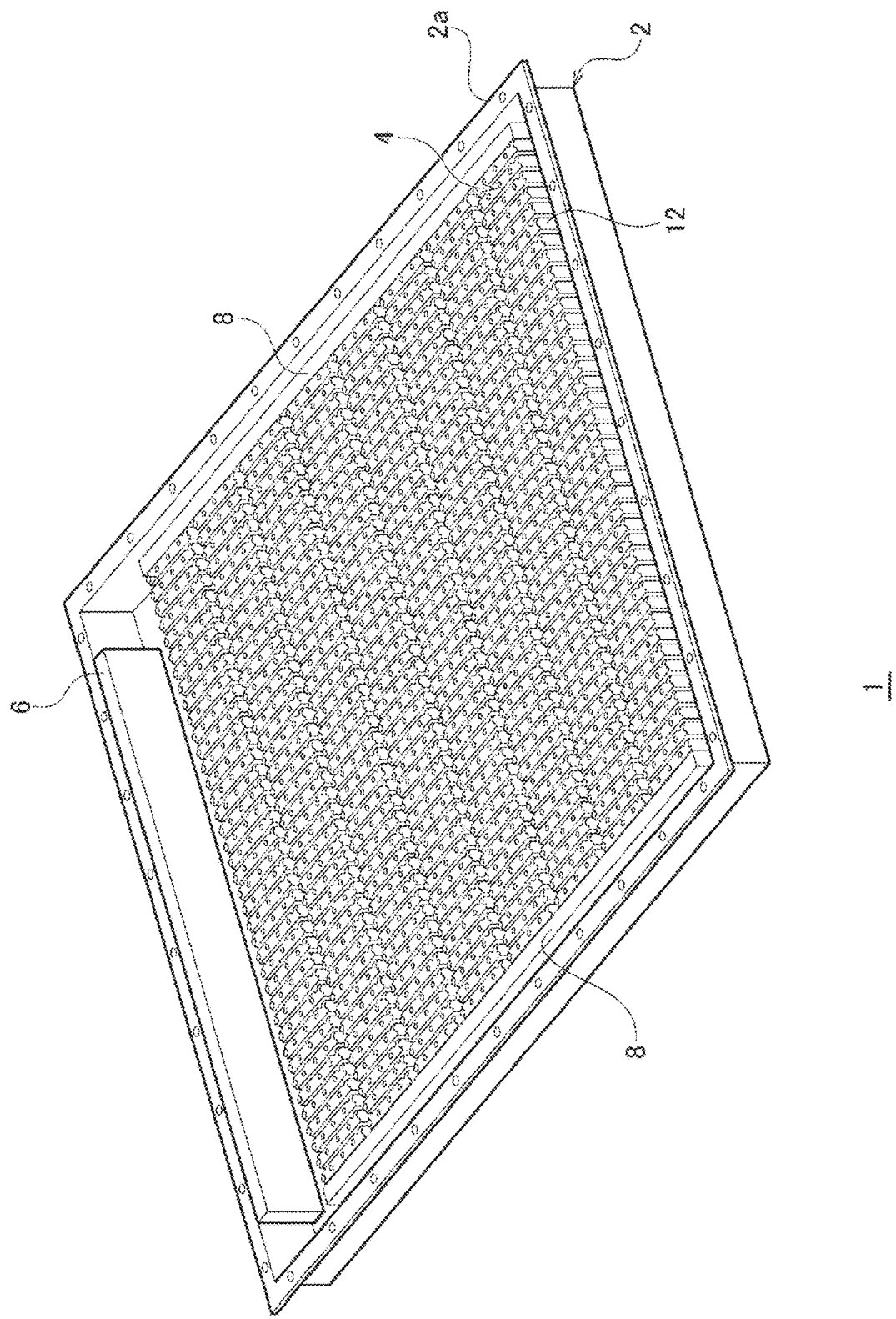
FIG. 1 is a schematic perspective view that illustrates a configuration of a battery pack according to an exemplary embodiment.

Hereinafter, the present invention will be described based on a preferred exemplary embodiment with reference to the drawings. The exemplary embodiment is an exemplification and does not limit the invention. All features described in the exemplary embodiment and combinations of the features are not necessarily essential to the invention. The same reference marks are assigned to the same or equivalent components, members, and processes illustrated in the drawings. Explanation for the same or equivalent components, members, and processes will not be repeated as appropriate. For convenience, scales or shapes of portions illustrated in the drawings are determined to facilitate explanation of the portions. The scales or shapes of the portions should not be interpreted as limitation unless otherwise mentioned. Further, some components may be illustrated on slightly different scales in different drawings. Further, terms "first", "second", and the like used in the present description or claims do not mean any order or importance, but are used to distinguish between one configuration and another configuration unless otherwise mentioned.

FIG. 1 is a schematic perspective view that illustrates a configuration of a battery pack according to an exemplary embodiment. In FIG. 1, a lid of a housing of the battery pack is not illustrated. Battery pack 1 according to the present exemplary embodiment includes housing 2, battery stacks 4, and battery pack exhaust duct 6. Housing 2 is a container that houses battery stacks 4 and battery pack exhaust duct 6. Preferably, housing 2 is waterproof. Housing 2 includes container 2a that has an opening, and the lid (not illustrated) that covers the opening of container 2a. Container 2a has a bottom sheet, and side walls that extend upward from a periphery of the bottom sheet. Housing 2 is fixed to an object (not illustrated), such as a vehicle body.

Each of battery stacks 4 includes a plurality of batteries 12 stacked together. For example, each of batteries 12 is a rechargeable secondary battery, such as a lithium-ion battery, a nickel-metal hydride battery, or a nickel-cadmium battery. Each of batteries 12 is what is called a prismatic (=rectangular) battery. Each of batteries 12 has a shape like a flat rectangular prism. The plurality of batteries 12 are stacked together in such a manner that main sides of batteries 12 that are next to each other face each other. The terms "stacked together" mean that a plurality of components are arranged along any one axis. Therefore, stacking batteries 12 together may mean horizontally arranging the plurality of batteries 12.

Further, batteries 12 are arranged in such a manner that output terminals of batteries 12 face in a same direction (for convenience, the output terminals face vertically upward in the present exemplary embodiment). Two of batteries 12 that are next to each other are stacked together in such a manner that a positive-electrode terminal of one of two batteries 12 is next to a negative-electrode terminal of the other one of batteries 12. A bus bar (not illustrated) electrically connects the positive-electrode terminal with the negative-electrode terminal. A bus bar may connect positive-electrode terminals of two batteries 12 that are next to each other, and a bus bar may connect negative-electrode terminals of two batteries 12 that are next to each other.

A separator (not illustrated) is between two of batteries 12 that are next to each other. That is to say, the plurality of batteries 12 and a plurality of the separators are stacked together alternately. For example, the separators are made of a resin that has an insulation property. Therefore, exterior cans of two of the batteries that are next to each other are electrically insulated from each other by one of the separators. In the present exemplary embodiment, each of battery stacks 4 includes 39 batteries 12. Housing 2 houses eight battery stacks 4. The plurality of battery stacks 4 are arranged along an axis that is perpendicular to an axis along which batteries 12 are stacked together. A number of batteries 12 and a number of battery stacks 4 are not particularly limited.

Housing 2 also houses a pair of end plates 8. Battery stacks 4 are between the end plates 8. One of the pair of end plates 8 is between container 2a and some of outermost batteries 12 along the axis along which batteries 12 are stacked together. The other one of the pair of end plates 8 is between container 2a and some of outermost batteries 12 along the axis along which batteries 12 are stacked together. One of the separators is between one of end plates 8 and each of batteries 12. Further, one of the separators is between the other one of end plates 8 and each of batteries 12. End plates 8 are metal sheets, for example. Since one of the separators is between one of end plates 8 and each of batteries 12, the separators insulate the one of end plates 8 from batteries 12. Further, since one of the separators is between the other one of end plates 8 and each of batteries 12, the separators insulate the other one of end plates 8 from batteries 12.

Battery stacks 4 and the pair of end plates 8 are bound together by binding bars (not illustrated). The binding bars bind the plurality of batteries 12 of each of battery stacks 4 along the axis along which batteries 12 are stacked together.

Battery pack exhaust duct 6 is provided within housing 2 of battery pack 1. Battery pack exhaust duct 6 discharges exhaust discharged from batteries 12 from housing 2. In the present exemplary embodiment, battery pack exhaust duct 6 extends along one of side walls of container 2a. Battery pack exhaust duct 6 is apart from battery stacks 4.

Figure 2:
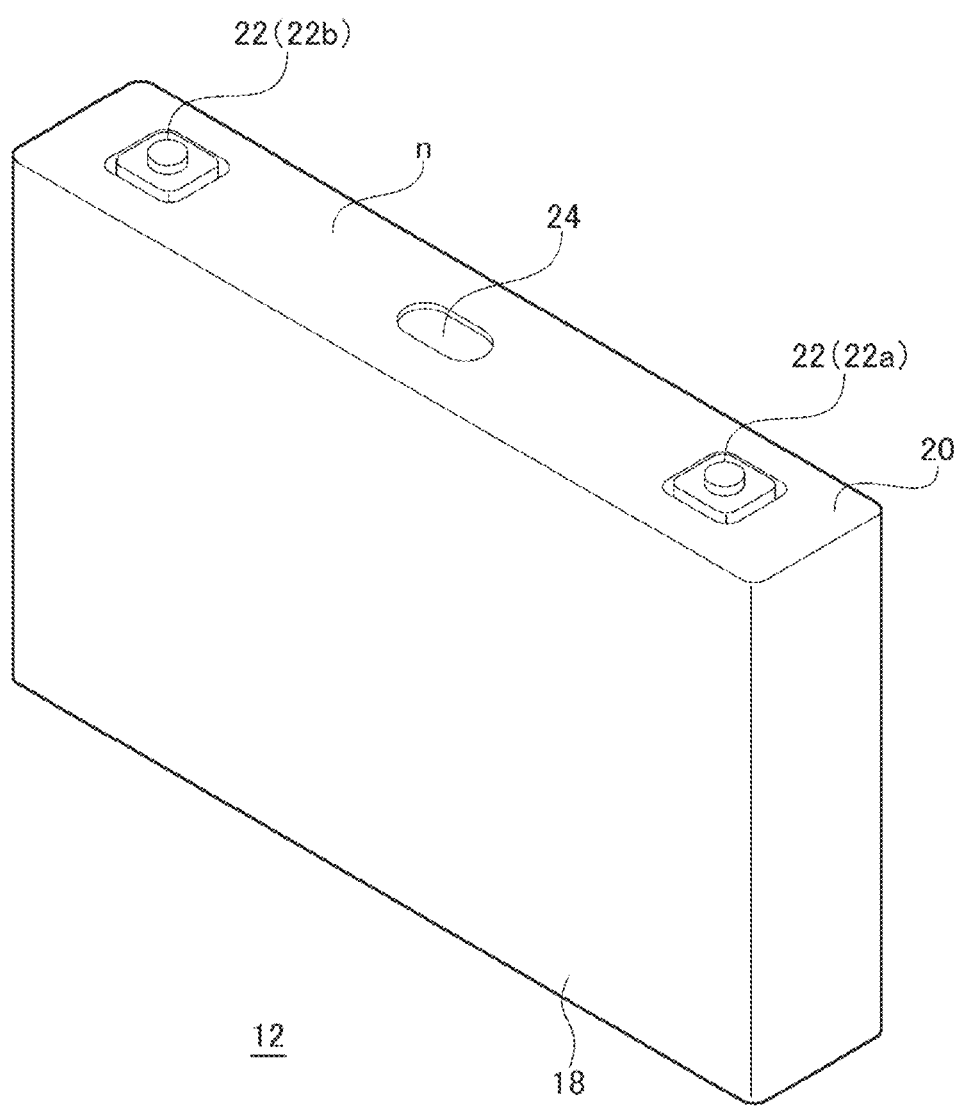
FIG. 2 is a schematic perspective view that illustrates a configuration of a battery.

Next, a configuration of batteries 12 and a configuration of battery pack exhaust duct 6 will be described in detail. FIG. 2 is a schematic perspective view that illustrates a configuration of one of batteries 12. Battery 12 includes exterior can 18 whose shape is a flat rectangular prism. Exterior can 18 has a side that has an opening. The opening is substantially rectangular. An electrode assembly and an electrolyte are put into exterior can 18 through this opening. Preferably, exterior can 18 is coated with an insulating sheet (not illustrated), such as a shrink tube. Since a surface of each of exterior cans 18 is coated with the insulating sheet, a short circuit does not occur between batteries 12 that are next to each other, and a short circuit does not occur between batteries 12 and each of end plates 8.

Sealing sheet 20 is attached to and seals the opening of exterior can 18. Sealing sheet 20 includes positive-electrode terminal 22a near one of two lengthways ends of sealing sheet 20. Further sealing sheet 20 includes negative-electrode terminal 22b near the other one of two lengthways ends of sealing sheet 20. Hereinafter, if polarities of output terminals do not need to be distinguished, positive-electrode terminals 22a and negative-electrode terminals 22b are appropriately and collectively referred to as output terminals 22. Sealing sheet 20 and output terminals 22 constitute a sealing body. Exterior can 18, sealing sheet 20, and output terminals 22 are electrical conductors, and are made of metal, for example.

In the present exemplary embodiment, a side on which the sealing body is attached is top surface n of battery 12. A bottom surface of battery 12 is opposite top surface n of battery 12. Battery 12 also has two main surfaces that each connect top surface n with the bottom surface. The main surfaces each have the largest area of areas of six surfaces of battery 12. In addition to top surface n, the bottom surface, and the two main surfaces, battery 12 has two side surfaces.

Battery 12 includes valve 24 in a surface. Valve 24 discharges gas generated within battery 12. In the present exemplary embodiment, battery 12 includes valve 24 in top surface n. Valve 24 is in sealing sheet 20, and is between the pair of output terminals 22. If a pressure within exterior can 18 rises to or above a predetermined value, valve 24 opens to discharge gas within the battery. Valve 24 is also called a safety valve or a vent. Exhaust discharged from valves 24 of batteries 12 is discharged from housing 2 through battery pack exhaust duct 6.

Figure 3:
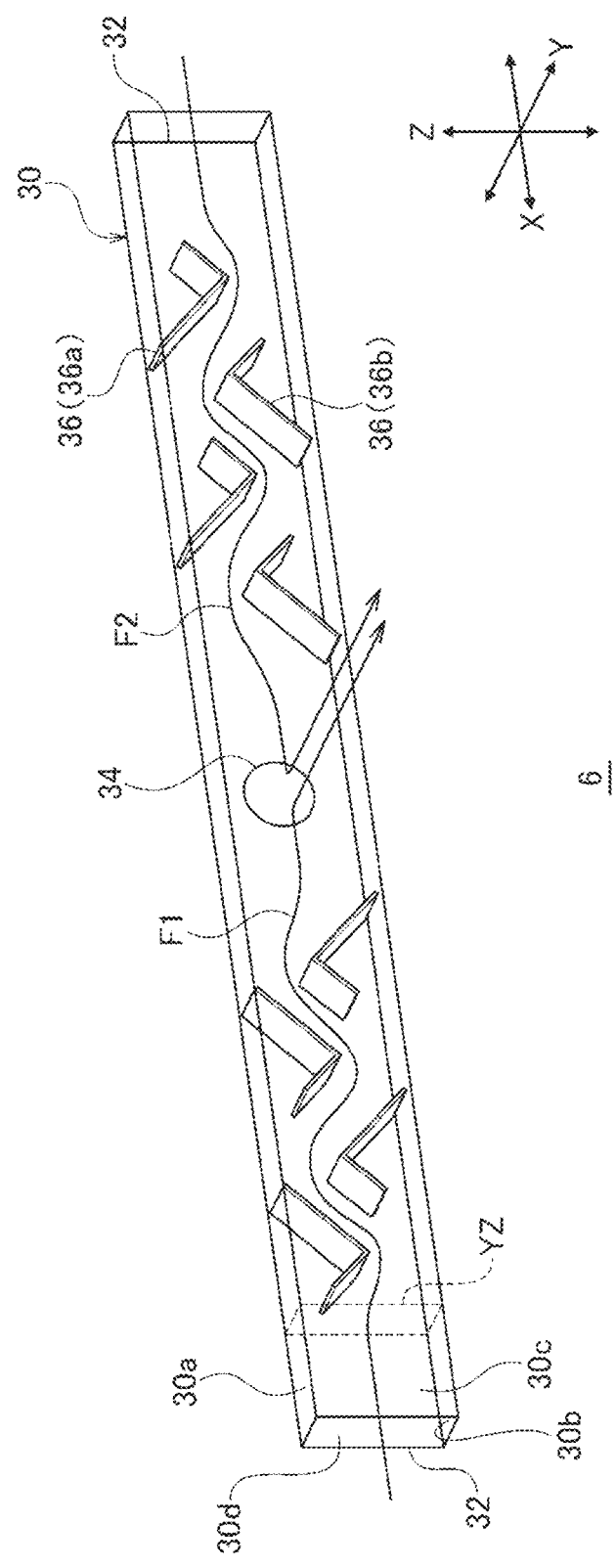
FIG. 3 is a schematic transparent perspective view that illustrates a configuration of a battery pack exhaust duct.

FIG. 3 is a schematic transparent perspective view that illustrates a configuration of battery pack exhaust duct 6. Battery pack exhaust duct 6 includes guide tube 30, exhaust inlets 32, exhaust outlet 34, and at least two exhaust guide components 36.

Guide tube 30 is a hollow tube, and is elongated along one axis. In the present exemplary embodiment, a cross section of guide tube 30 that is perpendicular to axis X along which guide tube 30 extends (Y-Z plane) is rectangular. Further, guide tube 30 has top wall 30a, bottom wall 30b, first side wall 30c, and second side wall 30d. The walls are flat sheets that extend along axis X along which guide tube 30 extends. Top wall 30a is opposite bottom wall 30b. First side wall 30c is opposite second side wall 30d. First side wall 30c and second side wall 30d connect top wall 30a with bottom wall 30b.

Exhaust inlets 32 are at both ends of guide tube 30, respectively. Therefore, in the present exemplary embodiment, battery pack exhaust duct 6 has two exhaust inlets 32. Exhaust inlets 32 are openings that each connect an inside of housing 2 with an inside of guide tube 30. Each of exhaust inlets 32 is formed by top wall 30a, bottom wall 30b, first side wall 30c, and second side wall 30d. Therefore, exhaust inlets 32 each have a rectangular shape that is similar to a shape of a cross section of guide tube 30.

Exhaust outlet 34 is in first side wall 30c. Exhaust outlet 34 is an opening that connects an inside of guide tube 30 with an outside of housing 2. In the present exemplary embodiment, exhaust outlet 34 is at a middle of guide tube 30, along axis X along which guide tube 30 extends. In the present exemplary embodiment, exhaust outlet 34 is circular. However, the shape of exhaust outlet 34 is not particularly limited.

Guide tube 30 is fixed to container 2a. Bottom wall 30b of guide tube 30 is in contact with the bottom sheet of container 2a. First side wall 30c of guide tube 30 is in contact with one of the side walls of container 2a. The one of the side walls of container 2a has an opening (not illustrated). Battery pack exhaust duct 6 is disposed in such a manner that a position of exhaust outlet 34 corresponds to a position of the opening. Exhaust is discharged from valves 24 of batteries 12. The exhaust enters guide tube 30 through exhaust inlets 32, and is discharged from housing 2 through exhaust outlet 34. Therefore, within guide tube 30, first exhaust flow F1 flows from one of two exhaust inlets 32 to exhaust outlet 34. Further, within guide tube 30, second exhaust flow F2 flows from the other one of two exhaust inlets 32 to exhaust outlet 34. First exhaust flow F1 and second exhaust flow F2 flow in opposite directions.

At least two exhaust guide components 36 are arranged within guide tube 30. Two or more exhaust guide components 36 are arranged within an area where first exhaust flow F1 extends. Further, two or more exhaust guide components 36 are arranged within an area where second exhaust flow F2 extends. At least two exhaust guide components 36 include first exhaust guide components 36a and second exhaust guide components 36b. First exhaust guide components 36a are arranged on one of two interior surfaces of guide tube 30 that are opposite each other. Second exhaust guide components 36b are arranged on the other one of two interior surfaces of guide tube 30 that are opposite each other. In the present exemplary embodiment, first exhaust guide components 36a are arranged on an interior surface of top wall 30a. Second exhaust guide components 36b are arranged on an interior surface of bottom wall 30b. First exhaust guide components 36a may be arranged on bottom wall 30b, and second exhaust guide components 36b may be arranged on top wall 30a.

Exhaust guide components 36 control first exhaust flow F1 and second exhaust flow F2. Further, exhaust guide components 36 collect particles in first exhaust flow F1 and particles in second exhaust flow F2. In the present exemplary embodiment, four exhaust guide components 36 are arranged within the area where first exhaust flow F1 extends. Further, four exhaust guide components 36 are arranged within the area where second exhaust flow F2 extends. Four exhaust guide components 36 include two first exhaust guide components 36a, and two second exhaust guide components 36b. From one of exhaust inlets 32 to exhaust outlet 34, first exhaust guide components 36a and second exhaust guide components 36b are arranged alternately. Therefore, the plurality of exhaust guide components 36 are arranged in a staggered (=zigzag) pattern within guide tube 30.

Figure 4:
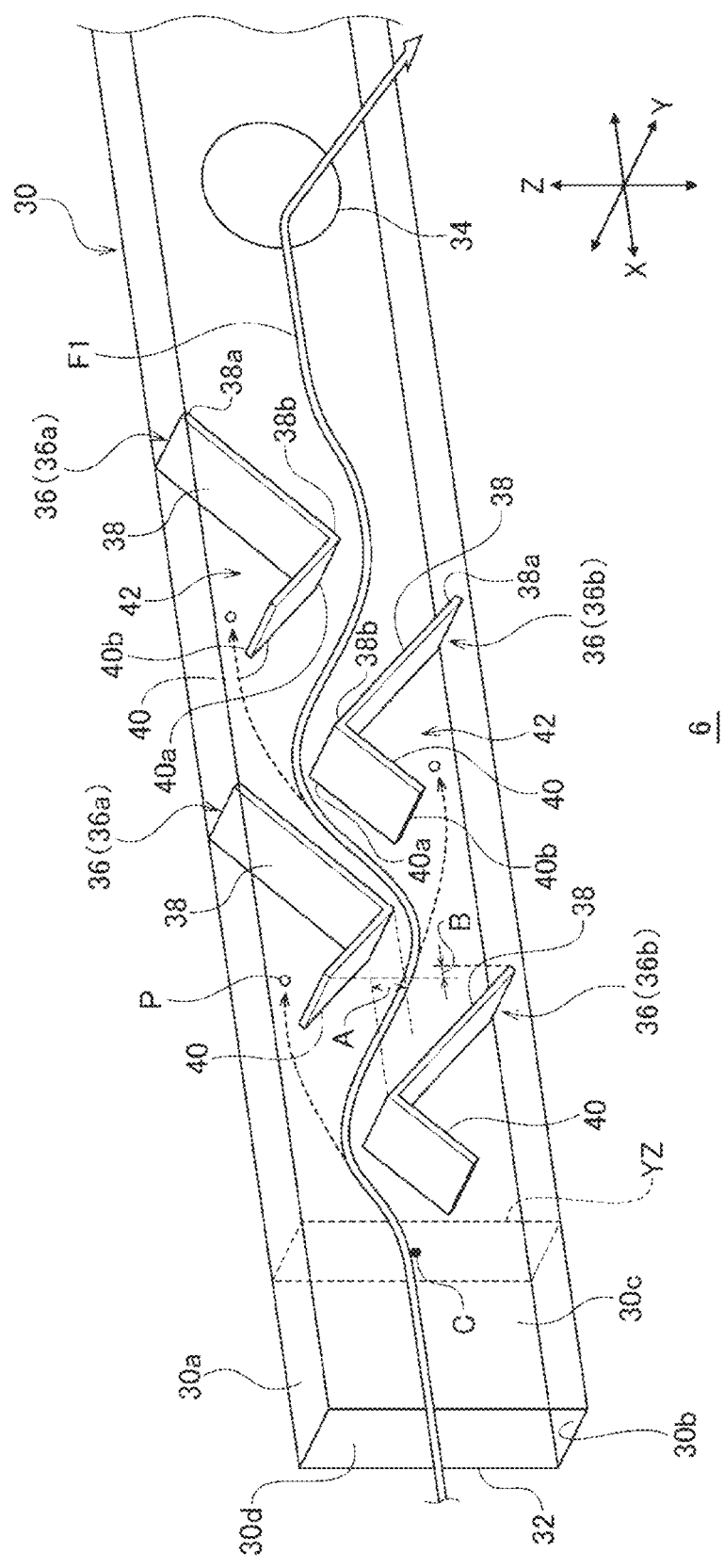
FIG. 4 is a transparent perspective view of part of the battery pack exhaust duct.

Hereinafter, exhaust guide components 36 will be described in detail. A shape, an arrangement, and an effect of exhaust guide components 36 within the area where first exhaust flow F1 extends are substantially same as a shape, an arrangement, and an effect of exhaust guide components 36 within the area where second exhaust flow F2 extends. Therefore, hereinafter, exhaust guide components 36 arranged within the area where first exhaust flow F1 extends will be exemplified. FIG. 4 is a transparent perspective view of part of battery pack exhaust duct 6.

Each of exhaust guide components 36 has first part 38 and second part 40. First part 38 and second part 40 each have a shape like a flat sheet. A flat sheet that forms first part 38 and a flat sheet that forms second part 40 may each have a hole or a slit as long as exhaust guide components 36 collect particles, as described below. That is to say, the flat sheet that forms first part 38 and the flat sheet that forms second part 40 may have a hole or a slit as long as exhaust guide components 36 collect particles to a desired degree. In this case, a size of the hole or the slit is smaller than sizes of the particles. For example, the size of the hole or the slit is smaller than or equal to approximately 2 mm. More preferably, the size of the hole or the slit is smaller than or equal to 1 mm.

First part 38 and second part 40 may be integral with each other and constitute each of exhaust guide components 36. Alternatively, first part 38 and second part 40 may be separate from each other and constitute each of exhaust guide components 36. If first part 38 and second part 40 are separate from each other, first part 38 may be in contact with second part 40. Alternatively, if first part 38 and second part 40 are separate from each other, a gap may be between first part 38 and second part 40 as long as exhaust guide components 36 collect particles. Preferably, a size of the gap is smaller than sizes of the particles. For example, the size of the gap is smaller than or equal to approximately 2 mm. More preferably, the size of the gap is smaller than or equal to 1 mm.

First end 38a of first part 38 is disposed nearer to an interior surface of guide tube 30 than second end 38b of first part 38 is. First end 38a may be in contact with the interior surface of guide tube 30. Alternatively, a gap may be between first end 38a and the interior surface of guide tube 30 as long as exhaust guide components 36 collect particles. Preferably, a size of the gap is smaller than sizes of the particles. For example, the size of the gap is smaller than or equal to approximately 2 mm. More preferably, the size of the gap is smaller than or equal to 1 mm. In the present exemplary embodiment, first end 38a is in contact with the interior surface of guide tube 30. First end 38a of each of first exhaust guide components 36a is in contact with an interior surface of top wall 30a. First end 38a of each of second exhaust guide components 36b is in contact with an interior surface of bottom wall 30b. Further, first part 38 extends from first end 38a toward exhaust inlet 32, and in a direction away from the interior surface with which first end 38a is in contact or away from the interior surface near which first end 38a exists. That is to say, first part 38 extends toward exhaust inlet 32, and toward center C in cross section YZ that is perpendicular to axis X along which guide tube 30 extends. In other words, first part 38 extends toward exhaust inlet 32, and toward a central side of first exhaust flow F1 from an outer side of first exhaust flow F1.

First end 40a of second part 40 is disposed nearer to first part 38 than second end 40b of second part 40 is. As described above, first end 40a may be in contact with first part 38. Alternatively, a gap may be between first end 40a and first part 38 that are near each other. In the present exemplary embodiment, first end 40a is in contact with second end 38b of first part 38. Second part 40 extends in a direction from first end 40a approaching the interior surface of guide tube 30 near which first part 38 exists. In other words, second part 40 extends in a direction from first end 40a toward the interior surface of guide tube 30 with which first end 38a of first part 38 is in contact. Alternatively, second part 40 extends in a direction from first end 40a approaching the interior surface of guide tube 30 near which first end 38a of first part 38 exists. That is to say, second part 40 extends toward an outer side of cross section YZ, or extends toward an outer side of first exhaust flow F1. Second part 40 of each of first exhaust guide components 36a extends toward an interior surface of top wall 30a. Second part 40 of each of second exhaust guide components 36b extends toward an interior surface of bottom wall 30b.

In the present exemplary embodiment, second part 40 extends toward exhaust inlet 32. That is to say, second part 40 slopes or is inclined toward exhaust inlet 32. Second end 40b of second part 40 is apart from the interior surface with which first part 38 is in contact. A distance between second end 40b and the interior surface is larger than or equal to sizes of particles.

First part 38 slopes or is inclined toward exhaust inlet 32 in such a manner that first part 38 is gradually apart from the interior surface toward exhaust inlet 32. Second part 40 slopes or is inclined toward exhaust inlet 32 in such a manner that second part 40 is gradually nearer to the interior surface toward exhaust inlet 32. Therefore, exhaust guide components 36 each have a shape like a letter "L" (=L-shape). A corner (=bending portion) of the letter "L" is at a central side of first exhaust flow F1.

One of two sides of first part 38 that each connect first end 38a with second end 38b is in contact with an interior surface of first side wall 30c. Alternatively, as long as exhaust guide components 36 collect particles, a gap is between the interior surface of first side wall 30c and one of two sides of first part 38 that each connect first end 38a with second end 38b. The other one of two sides of first part 38 that each connect first end 38a with second end 38b is in contact with an interior surface of second side wall 30d. Alternatively, as long as exhaust guide components 36 collect particles, a gap is between the interior surface of second side wall 30d and the other one of two sides of first part 38 that each connect first end 38a with second end 38b. One of two sides of second part 40 that each connect first end 40a with second end 40b is in contact with the interior surface of first side wall 30c. Alternatively, as long as exhaust guide components 36 collect particles, a gap is between the interior surface of first side wall 30c and one of two sides of second part 40 that each connect first end 40a with second end 40b. The other one of two sides of second part 40 that each connect first end 40a with second end 40b is in contact with the interior surface of second side wall 30d. Alternatively, as long as exhaust guide components 36 collect particles, a gap is between the interior surface of second side wall 30d and the other one of two sides of second part 40 that each connect first end 40a with second end 40b. Consequently, particle collecting pocket 42 is constituted near top wall 30a within guide tube 30. Particle collecting pocket 42 near top wall 30a is constituted by first exhaust guide component 36a, top wall 30a, first side wall 30c, and second side wall 30d. Further, particle collecting pocket 42 is constituted near bottom wall 30b within guide tube 30. Particle collecting pocket 42 near bottom wall 30b is constituted by second exhaust guide component 36b, bottom wall 30b, first side wall 30c, and second side wall 30d. An area between second end 40b of second part 40 and top wall 30a or bottom wall 30b is an inlet of collecting pocket 42.

Second end 40b of second part 40 of first exhaust guide component 36a and second end 40b of second part 40 of second exhaust guide component 36b are disposed at different positions along axis X along which guide tube 30 extends. Therefore, at least part of second part 40 of first exhaust guide component 36a is opposite at least part of first part 38 of second exhaust guide component 36b. Consequently, a channel is formed through which first exhaust flow F1 flows. In the present exemplary embodiment, second part 40 of first exhaust guide component 36a second part 40 of second exhaust guide component 36b, are not overlapped, are disposed at different positions, or are displaced, along axis X along which guide tube 30 extends.

If exhaust guide components 36 are arranged as described above, first exhaust flow F1 flows toward top wall 30a along second part 40 of second exhaust guide component 36b. Then first exhaust flow F1 flows toward bottom wall 30b along a channel between second part 40 of first exhaust guide component 36a and first part 38 of second exhaust guide component 36b. Then first exhaust flow F1 flows toward top wall 30a along first part 38 of first exhaust guide component 36a. Consequently, first exhaust flow F1 meanders in a zigzag pattern.

One of second exhaust guide components 36b is between two first exhaust guide components 36a, along axis X along which guide tube 30 extends. Consequently, second part 40 of the one of second exhaust guide components 36b is opposite first part 38 of one of two first exhaust guide components 36a. Further, first part 38 of the one of second exhaust guide components 36b is opposite second part 40 of the other one of two first exhaust guide components 36a. Consequently, first exhaust flow F1 more surely meanders.

Further, one of first exhaust guide components 36a is between two second exhaust guide components 36b, along axis X along which guide tube 30 extends. Consequently, second part 40 of the one of first exhaust guide components 36a is opposite first part 38 of one of two second exhaust guide components 36b. Further, first part 38 of the one of first exhaust guide components 36a is opposite second part 40 of the other one of two second exhaust guide components 36b. Consequently, first exhaust flow F1 more surely meanders.

When first exhaust guide component 36a and second exhaust guide component 36b are seen along axis X along which guide tube 30 extends, second part 40 of first exhaust guide component 36a at least partly overlaps first part 38 of second exhaust guide component 36b (an extent indicated by arrow A in FIG. 4). Consequently, first exhaust flow F1 meanders more.

When first exhaust guide component 36a and second exhaust guide component 36b are seen along axis Z that is perpendicular to axis X along which guide tube 30 extends (an axis along which top wall 30a is opposite bottom wall 30b), second part 40 of first exhaust guide component 36a at least partly overlaps first part 38 of second exhaust guide component 36b (an extent indicated by arrow B in FIG. 4). Consequently, first exhaust flow F1 meanders more.

Exhaust contains gas and particles P. Mass of each of particles P is heavier than mass of gas. When first exhaust flow F1 meanders, inertial force (or centrifugal force) that acts on each of particles P is larger than inertial force (or centrifugal force) that acts on the gas. Consequently, particles P separate from first exhaust flow F1 and move toward openings of collecting pockets 42. Then particles P are collected in collecting pockets 42. Each of collecting pockets 42 has a small inlet (outlet), and becomes wider from the small inlet. Therefore, particles P that have entered collecting pockets 42 are less likely to leave collecting pockets 42.

Figure 5A:
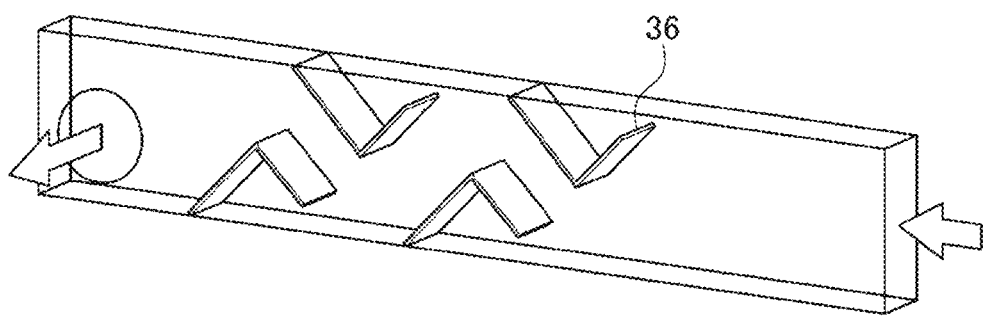
FIG. 5A is a transparent perspective view of the battery pack exhaust duct according to the exemplary embodiment.
Figure 5B:
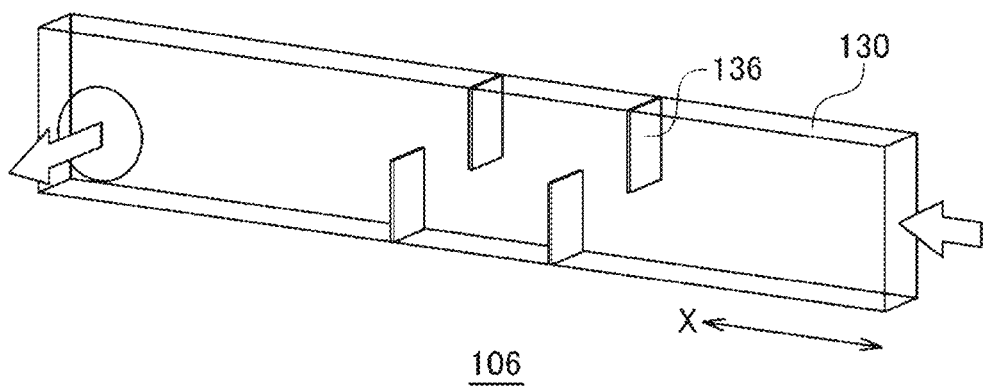
FIG. 5B is a transparent perspective view of a battery pack exhaust duct according to Comparative Example 1.
Figure 5C:
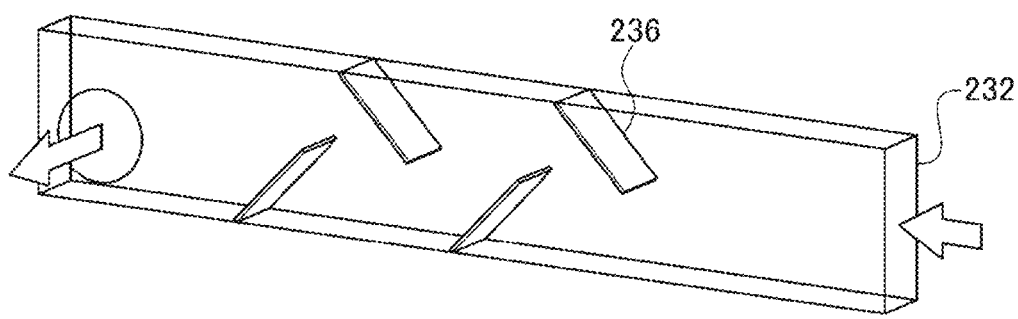
FIG. 5C is a transparent perspective view of a battery pack exhaust duct according to Comparative Example 2.

To analyze relations between shapes of exhaust guide components 36 and particle P collection efficiency, the inventor of the present invention used battery pack exhaust duct 6 according to the exemplary embodiment, a battery pack exhaust duct according to Comparative Example 1, and a battery pack exhaust duct according to Comparative Example 2. FIG. 5A is a transparent perspective view of the battery pack exhaust duct according to the exemplary embodiment. FIG. 5B is a transparent perspective view of the battery pack exhaust duct according to Comparative Example 1. FIG. 5C is a transparent perspective view of the battery pack exhaust duct according to Comparative Example 2. In the present analysis, the ducts each have one exhaust inlet.

In battery pack exhaust duct 6 according to the exemplary embodiment, exhaust guide components 36 are arranged in a staggered pattern. Exhaust guide components 36 each have a shape like a letter "L". In battery pack exhaust duct 106 according to Comparative Example 1, exhaust guide components 136 are arranged in a staggered pattern. Exhaust guide components 136 each have a shape like a flat sheet and are each perpendicular to axis X along which guide tube 130 extends. In battery pack exhaust duct 206 according to Comparative Example 2, exhaust guide components 236 are arranged in a staggered pattern. Exhaust guide components 236 each have a shape like a flat sheet and each slope toward exhaust inlet 232.

Figure 6A:
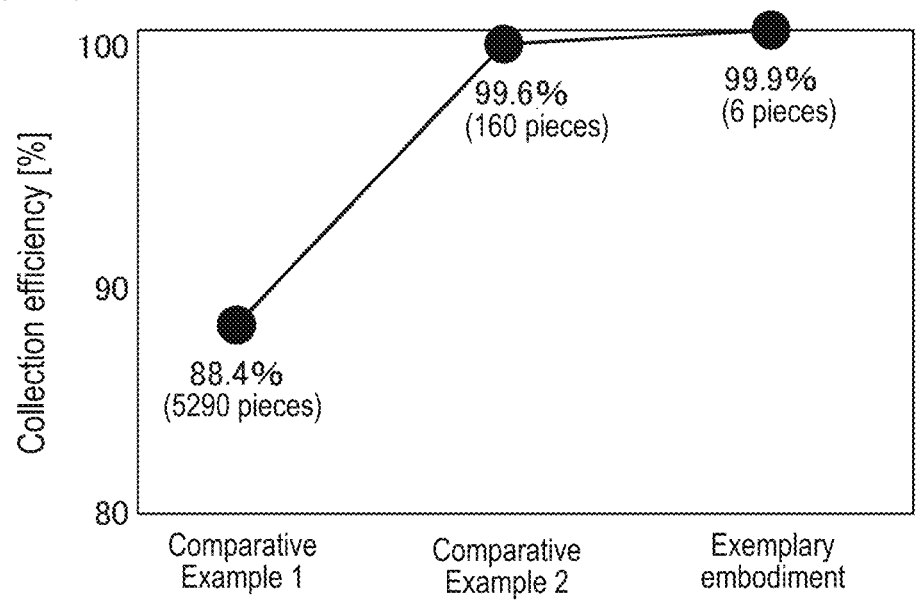
FIG. 6A shows particle collection efficiency of each of the battery pack exhaust ducts according to the exemplary embodiment, Comparative Example 1, and Comparative Example 2.
Figure 6B:
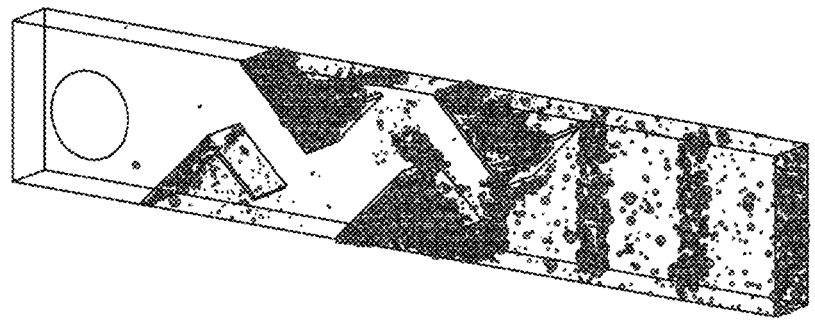
FIG. 6B shows a result of a simulation of the battery pack exhaust duct according to the exemplary embodiment.

Simulations of how particles P are collected by each of battery pack exhaust ducts 6, 106, 206 were performed under analysis conditions described below. Based on results of the simulations, particle P collection efficiency was measured. The analysis conditions were as follows. A number of particles that flowed into each of the battery pack exhaust ducts was 45,000. A flow rate of the particles was 0.3 kg/sec. A period of time was 0.1 seconds. A pressure loss was 55 kPa. The results are shown in FIGS. 6A and 6B. FIG. 6A shows particle collection efficiency of each of the battery pack exhaust ducts according to the exemplary embodiment, Comparative Example 1, and Comparative Example 2. FIG. 6B shows a result of the simulation of the battery pack exhaust duct according to the exemplary embodiment. In FIG. 6A, numerical values in parentheses are numbers of particles that flowed into and were not collected by each of the battery pack exhaust ducts according the exemplary embodiment, and Comparative Examples 1, 2 (numbers of particles discharged from the ducts).

As shown in FIGS. 6A and 6B, collection efficiency of battery pack exhaust duct 6 according to the exemplary embodiment was higher than collection efficiency of each of the battery pack exhaust ducts according to Comparative Example 1 and Comparative Example 2. The collection efficiency of battery pack exhaust duct 6 according to the exemplary embodiment was very high and was 99.9%. The facts show that an amount of particles P discharged from housing 2 is significantly decreased by collecting pockets 42 constituted by exhaust guide components 36, respectively, and by an exhaust flow that is allowed to meander to deliver particles P into collecting pockets 42.

As described above, battery pack exhaust duct 6 according to the present exemplary embodiment includes guide tube 30, exhaust inlets 32, exhaust outlet 34, and at least two exhaust guide components 36. At least two exhaust guide components 36 include first exhaust guide components 36a and second exhaust guide components 36b. First exhaust guide components 36a are arranged on one of two interior surfaces of guide tube 30 that are opposite each other. Second exhaust guide components 36b are arranged on the other one of two interior surfaces of guide tube 30 that are opposite each other. First exhaust guide components 36a are arranged on top wall 30a of guide tube 30. Second exhaust guide components 36b are arranged on bottom wall 30b of guide tube 30.

Each of exhaust guide components 36 has first part 38 and second part 40. First end 38a of first part 38 is in contact with or near an interior surface of guide tube 30. More specifically, first end 38a of first part 38 is in contact with or near top wall 30a or bottom wall 30b of guide tube 30. Further, first part 38 extends in a direction away from the interior surface, and toward one of exhaust inlets 32. First end 40a of second part 40 is in contact with or near first part 38. Second part 40 extends in a direction approaching the interior surface of guide tube 30 near which first part 38 exists. Second end 40b of second part 40 is apart from the interior surface. Each of exhaust guide components 36 constitutes collecting pocket 42. Each of collecting pockets 42 has an opening that faces an upstream side of an exhaust flow.

Second end 40b of second part 40 of first exhaust guide component 36a and second end 40b of second part 40 of second exhaust guide component 36b are at different positions along axis X along which guide tube 30 extends. Consequently, first exhaust flow F1 and second exhaust flow F2 meander. When exhaust flows meander, inertial force acts on particles P. The inertial force delivers particles P into collecting pockets 42 of exhaust guide components 36.

Since particles P are collected by exhaust guide components 36, a heat source that is one of three factors of ignition is not discharged from housing 2. Consequently, ignition and production of smoke are not allowed outside housing 2. Consequently, conditions in which ignition does not occur are satisfied. The conditions in which ignition does not occur are regulated by laws and regulations related to battery pack 1. Further, since first exhaust flow F1 meanders, exhaust flows through a longer distance. Consequently, a temperature and a pressure of the exhaust are lowered. Consequently, ignition and production of smoke are further not allowed.

Battery pack exhaust duct 6 according to the present exemplary embodiment includes guide tube 30 in which exhaust guide components 36 are arranged. Exhaust guide components 36 each have a shape like a sheet. Therefore, a shape of battery pack exhaust duct 6 is easily changed. Therefore, battery pack exhaust duct 6 has a shape suitable to be disposed in a small space within housing 2. For example, battery pack exhaust duct 6 has a shape like a flat rectangular prism. Consequently, battery pack exhaust duct 6 is allowed to efficiently occupy a space. Further, a size of battery pack 1 is small.

As described above, battery pack exhaust duct 6 according to the present exemplary embodiment collects particles at high particle collection efficiency, and efficiently occupies a space. Battery pack 1 that includes battery pack exhaust duct 6 is safer.

In battery pack exhaust duct 6 according to the present exemplary embodiment, second parts 40 extend toward one of exhaust inlets 32. Consequently, flows of exhaust more smoothly meander. Consequently, exhaust guide components 36 less increase a pressure loss of the flows of exhaust.

When first exhaust guide component 36a and second exhaust guide component 36b are seen along axis X along which guide tube 30 extends, second part 40 of first exhaust guide component 36a at least partly overlaps first part 38 of second exhaust guide component 36b. When first exhaust guide component 36a and second exhaust guide component 36b are seen along an axis that is perpendicular to axis X along which guide tube 30 extends, second part 40 of first exhaust guide component 36a at least partly overlaps first part 38 of second exhaust guide component 36b. Consequently, flows of exhaust meander more. Consequently, particles P are more surely collected.

In battery pack exhaust duct 6 according to the present exemplary embodiment, exhaust guide components 36 are arranged in a staggered pattern. Exhaust guide components 36 each have a shape like a letter "L". Corners of exhaust guide components 36 are at a central side of guide tube 30. The corners are at different positions along axis X along which guide tube 30 extends. Consequently, flows of exhaust more surely meander, and particles P are more surely collected.

The present invention is not limited to the above exemplary embodiment. A shape of the above exemplary embodiment may be variously changed based on knowledge of the person of ordinary skill in the art. For example, a design for the above exemplary embodiment may be variously changed. The modified exemplary embodiments also fall within a scope of the present invention. New exemplary embodiments obtained by modifying the above exemplary embodiment have effects of the above exemplary embodiment and effects of the modification.

A number of exhaust inlets 32 and a number of exhaust outlet 34 are not particularly limited. For example, the number of exhaust inlet 32 may be one, and the number of exhaust outlet 34 may be one. If the number of exhaust inlets 32 is two and the number of exhaust outlet 34 is one, two exhaust flows flow from exhaust inlets 32 to exhaust outlet 34 through guide tube 30. In this case, the two exhaust flows each flow slower than one exhaust flow flows through guide tube 30. Consequently, inertial force that acts on particles P decreases. Consequently, particle P collection efficiency per exhaust flow may decrease. However, exhaust guide components 36 less increase a pressure loss in guide tube 30.

If the number of exhaust inlet 32 is one and the number of exhaust outlet 34 is one, one exhaust flow flows through guide tube 30. In this case, the one exhaust flow flows faster than two exhaust flows flow through guide tube 30. Consequently, exhaust guide components 36 may more increase a pressure loss in guide tube 30. However, inertial force that acts on particles P increases. Consequently, particle P collection efficiency per exhaust flow increases. If the number of exhaust inlet 32 is one and the number of exhaust outlet 34 is one, one of two openings of guide tube 30 may be used as exhaust inlet 32, and the other one of the two openings of guide tube 30 may be used as exhaust outlet 34.

The invention claimed is:

1. A battery pack exhaust duct disposed within a housing of a battery pack, the battery pack exhaust duct comprising:
 a guide tube that is hollow;
 an exhaust inlet through which an inside of the housing communicates with an inside of the guide tube;
 an exhaust outlet through which the inside of the guide tube communicates with an outside of the housing; and
 at least two exhaust guide components arranged within the guide tube, wherein:
 the at least two exhaust guide components include a first exhaust guide component and a second exhaust guide component, the first exhaust guide component is disposed on a first interior surface of two interior surfaces of the guide tube that are opposite each other, the second exhaust guide component is disposed on a second interior surface of the two interior surfaces of the guide tube,
 each of the first and second exhaust guide components has a first part and a second part, the first part has a first end that is disposed near to a corresponding one interior surface among the first and second interior surfaces, and the first part extends in a direction away from the corresponding one interior surface and extends toward the exhaust inlet, the second part has a first end that is disposed near to the first part, the second part extends in a direction approaching the corresponding one interior surface near which the first part exists, and the second part has a second end that is apart from the corresponding one interior surface, a first inlet is formed by the second end of the second part of the first exhaust guide component and the first interior surface, a second inlet is formed by the second end of the second part of the second exhaust guide, component and the second interior surface, and the second end of the second part of the first exhaust guide component and the second end of the second part of the second exhaust guide component are displaced along an axis along which the guide tube extends.

2. The battery pack exhaust duct according to claim 1, wherein the second parts extend toward the exhaust inlet.

3. The battery pack exhaust duct according to claim 1, wherein when the first exhaust guide component and the second exhaust guide component are seen along an axis along which the guide tube extends, the second part of the first exhaust guide component at least partly overlaps the first part of the second exhaust guide component.

4. The battery pack exhaust duct according to claim 1, wherein when the first exhaust guide component and the second exhaust guide component are seen along the axis that is perpendicular to the axis along which the guide tube extends, the second part of the first exhaust guide component at least partly overlaps the first part of the second exhaust guide component.

5. The battery pack exhaust duct according to claim 1, wherein the exhaust guide components each have a L-shape.

6. A battery pack comprising:
a battery that includes a valve that opens to discharge gas if a pressure increases within the battery;
the battery pack exhaust duct according to claim 1; and
a housing that houses the battery and the battery pack exhaust duct.

7. The battery pack exhaust duct according to claim 1, wherein the exhaust inlet includes two exhaust inlets disposed at both ends of the guide tube.

8. The battery pack exhaust duct according to claim 1, wherein each of the first part and second part of each of the first and second exhaust guide components has a hole or a slit.

9. The battery pack exhaust duct according to claim 8, wherein a size of the hole or the slit is smaller than or equal to 2 mm.

10. The battery pack exhaust duct according to claim 1, wherein the first part and the second part of the first exhaust guide component are separate from each other, and the first part and the second part of the second exhaust guide component are separate from each other.

11. The battery pack exhaust duct according to claim 10, wherein a first gap exists between the first part and second part of the first exhaust guide component, and a second gap exists between the first part and second part of the second exhaust guide component.

12. The battery pack exhaust duct according to claim 11, wherein a size of the first gap and the second gap is smaller than or equal to 2 mm.

* * * * *